United States Patent [19]

Forest et al.

[11] Patent Number: 5,893,693
[45] Date of Patent: Apr. 13, 1999

[54] METAL DOWEL FOR ANCHORAGE IN THIN WALL PANELS

[75] Inventors: Guy Forest, Voreppe; Charles Barnavol; Jean Collas, both of Grenoble; Jean-Jacques Légat, Colombe, all of France

[73] Assignee: A. Raymond & Cie., France

[21] Appl. No.: 08/816,945

[22] Filed: Feb. 28, 1997

[30] Foreign Application Priority Data

Mar. 1, 1996 [DE] Germany ............ 296 03 773 U

[51] Int. Cl.$^6$ ........................... F16B 13/04
[52] U.S. Cl. .................. 411/30; 411/34; 411/437; 52/705
[58] Field of Search ............. 411/30, 38, 42, 411/55, 61, 437, 439; 52/705

[56] References Cited

U.S. PATENT DOCUMENTS

| | | | |
|---|---|---|---|
| 4,430,033 | 2/1984 | McKewan | 411/437 X |
| 4,500,238 | 2/1985 | Vassiliou | 411/30 |
| 5,078,561 | 1/1992 | Wollar et al. | 411/38 |
| 5,205,688 | 4/1993 | Sundstrom | 411/38 |
| 5,207,750 | 5/1993 | Rapata | 411/38 |
| 5,443,343 | 8/1995 | Mutz et al. | |
| 5,447,005 | 9/1995 | Giannuzzi | 411/30 X |
| 5,536,121 | 7/1996 | McSherry | 411/31 |

*Primary Examiner*—Christopher Kent
*Assistant Examiner*—Timothy B. Kang
*Attorney, Agent, or Firm*—Gifford, Krass, Groh, Sprinkle, Patmore, Anderson & Citkowski, P.C.

[57] ABSTRACT

A metal anchor for mounting screws in thin wall boards made of plasterboard, pressed wood or similar building material includes a body (1) formed from a sheet metal plate and provided with semi circular retention ridges (2) projecting alternately to each side, which are matched in width and pitch to the thread shape of the screw (13) to be tightened such that the retention ridges (2) engage into the latter's thread grooves (19). The entire body (1) is formed of three sections, of which the first section (4), situated on the outer end, bears the retention ridges (2), the second section (5), situated in the middle, has two axially running outer bending ridges (7) and two inner bending ridges (8) which are mutually separated by slits (12) and can be bent off in opposing directions, and the third section (6), situated at the head end, is provided with semi circular guide shells (9) extending in opposed directions for inserting the screw (13.).

4 Claims, 1 Drawing Sheet

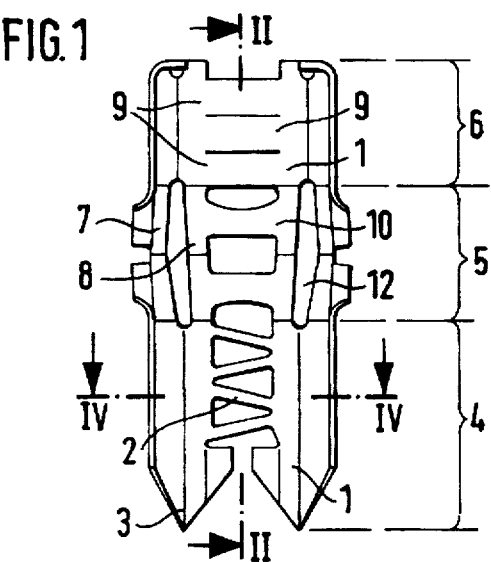
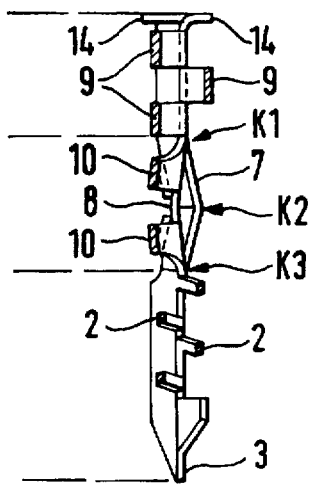
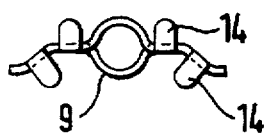
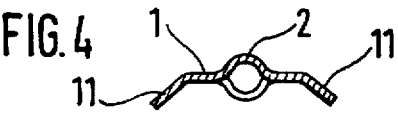
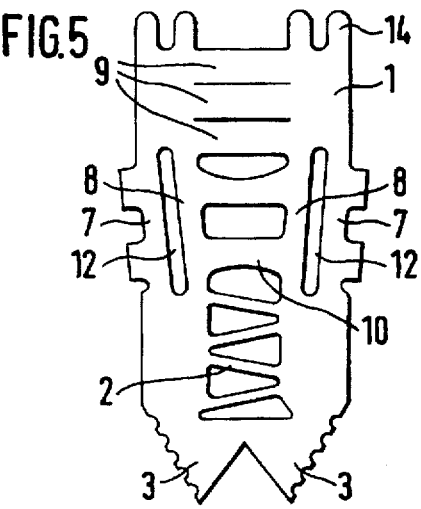
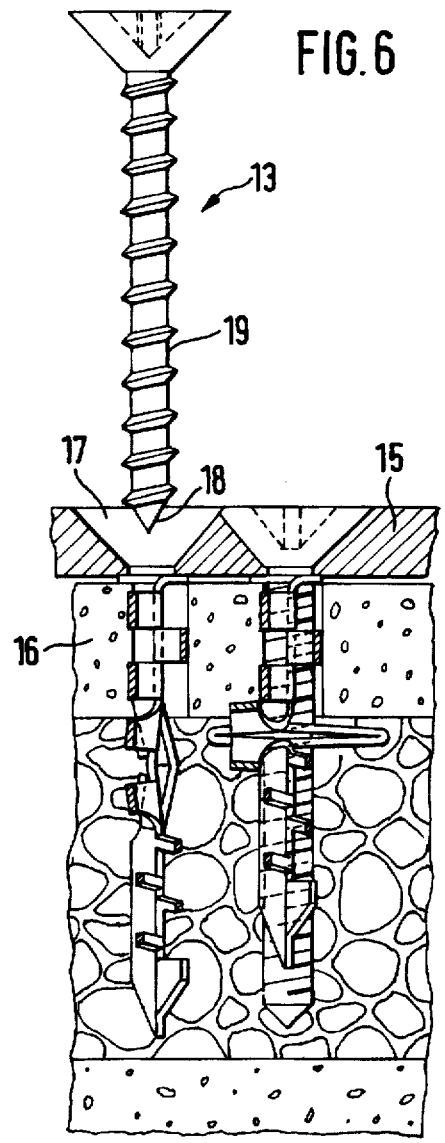

METAL DOWEL FOR ANCHORAGE IN THIN WALL PANELS

BACKGROUND OF THE INVENTION

The invention pertains to a metal dowel to be anchored in thin wall boards made of plasterboard, pressed wood or similar building material, wherein the dowel shaft is formed from a sheet metal plate and provided with semi circular retention ridges punched out of the shaft and projecting alternately to each side, which are matched in width and pitch to the thread shape of the screw to be tightened such that the retention ridges engage into the thread grooves of the latter.

DESCRIPTION OF THE PRIOR

U.S. Pat. No. 5,443,343 discloses such a metal dowel, in which two spreadable shaft sections are connected in one piece at their tips by a thin ridge and are bent apart. The semi circular retention ridges for tightening the screw are located in this case in the head area of the shaft. When tightening the screw into the thread ridges, the tip of the screw pushes between the two shaft sections and spreads them apart such that they find support on the back side of the wall board.

This metal dowel can indeed be driven easily into the plasterboard sheets and also offers enormous retention power. It has the difficulty, however, that double the length of sheet metal material is consumed for manufacturing the shaft, due to the two folded-apart shaft halves. The problem of the invention is to design this metal dowel such that less material is needed for the same functionality and equally good retention power.

SUMMARY OF THE INVENTION

This problem is solved in that the entire shaft is formed of three sections, of which the first section, situated on the outer end, bears the retention ridges, the second section, situated in the middle, is formed of two axially running outer bending ridges and two inner bending ridges, which are mutually separated by slits and can be bent off in opposing directions, and the third section, situated at the head end, is provided with semi circular guide shells pointing to both sides for inserting the screw. Because of this shaft design, it is now possible to stamp the metal dowel out of a sheet metal plate and to form it such that, due to the lower material consumption, the manufacturing costs are considerably lower than for the known two-ply metal dowel.

If appropriately hardened spring steel is used, the formed dowel can be driven into the aforementioned wall boards without difficulty. By tightening the screw into the retention ridges at the dowel tip, the tip is pulled towards the wall board from the rear. In the process the outer ridges of the middle section bend off to one side and the two inner ridges to the other side, and support themselves on the back side of the wall over half the width of the bending ridges.

Additional beneficial characteristics for constructing the invention are disclosed as follows. The bending ridges of the middle section are bent over exactly at the specified bending lines. The connection of the two half-round inner cross-ridges has the effect of strengthening the bending ridges and thus the middle section of the shaft and insures that the dowel keeps its shape when being driven into the wall board. An additional reinforcing effect is achieved by bending away the axial shaft edges.

BRIEF DESCRIPTION OF THE DRAWINGS

An embodiment of the invention which is described below is presented in the drawings.

FIG. 1 is a front view of a metal dowel according to the invention;

FIG. 2 is a sectional view taken along line II—II of FIG. 1 of the metal dowel;

FIG. 3 is a plan view of the metal dowel;

FIG. 4 is a cross section through the shaft along line IV—IV in FIG. 1;

FIG. 5 is a front view of a plate used for manufacturing the dowel after punching out the shaft blank; and FIG. 6 is a cross sectional view of the metal dowel in the installed state, to the left before and to the right after tightening the screw.

DETAILED DESCRIPTION OF THE PREFERRED EMBODIMENT OF THE PRESENT INVENTION

The metal dowel shown in the figures serves for anchoring in thin wall boards of plasterboard, pressed wood or similar building material. An elongated body 1, is, as is shown in FIG. 5, punched in one ply out of a sheet metal plate and stamped, and consists of three sections. A first lower section 4 has two tips 3 at its outer end and is provided with several retention ridges 2 stamped out of the central strip and formed to project outwardly alternately to each side and which match the width and pitch of the thread shape of the screw 13 to be inserted such that the retention ridges 2 engage into its thread grooves 19.

A middle section 5 serves for the actual anchoring and is formed by two outer bending ridges 7 running parallel to the axis and two inner bending ridges 8, which are separated from the outer bending ridges 7 by slits 12. The two outer ridges 7 are bent off slightly to one side out of the shaft plane at the bending lines K1, K2 and K3, while the two inner ridges 8 are bent slightly away to the opposite side at the bending lines at the same height and as is evident from FIG. 2, they form a narrow rhombus in cross section with the outer ridges 7. The inner bending ridges 8 are connected together by two cross ridges 10, which span the free space needed for the introduction of the screw 13 in a semi circular shape on the side provided for bending outwards.

A head section 6 is provided with semi circular guide shells 9 for the screw 13, which are formed pointing alternately outwards to each side, the head end, possesses flaps 14 projecting outwards on each side intended to make contact with the wall board 15 when driving in the dowel as shown in FIG. 4 the cross-section of the shaft 1 is, moreover, strengthened at both sides of the retention ridges 2 of the lower section 4 by edges 11 bent away parallel to the axis.

The functioning of the metal dowel is illustrated graphically in FIG. 6. In order to fasten a flat object, such as a plate 15 on the wall board 16, the metal dowel is driven via the flaps 14 into the wall board 16 until the flaps 14 lie against the wall board surface. Then the screw 13 is introduced through a hole 17 in the plate 15 and the guide shells 9 of the head section 6, until the screw tip 18 has reached the screw area of the lower shaft section 4 and the retention ridges 2 engage in the thread grooves 19.

Upon further tightening of the screw 13, the lower shaft section 4 is pulled upwards, i.e., in the direction of the head section 6, with the ridges 7 and 8 bending outwardly in opposite directions at the designated bending lines K1, K2 and K3 and supporting themselves on the back side of the wall board 15 over half the width of the bent ridges 7 and 8.

In case the screw 13 must be loosened later, the metal dowel remains behind in its anchoring position and can be used again at any time for inserting the screw 13.

We claim:

1. A metal anchor for holding a threaded fastener having a predetermined thread shape in a wall board, said anchor comprising:

a sheet metal plate having an elongated body having a middle section extending between a lower section and a top section; said lower section having a plurality of semi-circular ridge portions extending between a pair of longitudinally extending planar portions, said ridge portions extending outwardly and being angled between said pair of planar portions in opposing directions, said plurality of ridge portions having a predetermined width and pitch to form a shape for retaining said threaded fastener in said anchor, said middle section having two pairs of longitudinally aligned bendable strip portions, each of said pair of strip portions being separated by a slit and being capable of being bent outwardly in opposing directions, said top section having a plurality of semi-circular guide shells extending outwardly, said guide shells being formed to freely accept said screw therebetween.

2. The metal anchor of claim 1, wherein each of said two pairs of bending portions have a top, a middle and a lower bend line forming two portions which are bent with respect to each other about said middle line.

3. The metal anchor of claim 1, further comprising a pair of semi-circular portions extending between said inner bend portions, said pair of cross portions adapted to freely accept said screw therebetween.

4. The metal anchor of claim 1, wherein said lower portion further comprises a pair of edge portions spaced apart on opposite sides of a central notch to extend outwardly from beyond said ridge portions, said edge portions being angled with respect to a plane extending on an axis of said body to strengthen said lower portion.

* * * * *

UNITED STATES PATENT AND TRADEMARK OFFICE
CERTIFICATE OF CORRECTION

PATENT NO. : 5,893,693
DATED : April 13, 1999
INVENTOR(S) : Guy Forest et al

It is certified that error appears in the above-identified patent and that said Letters Patent is hereby corrected as shown below:

Column 1, line 58, delete "half-round" and insert --semi-circular--.
Column 2, line 27, delete "the" (third occurrence) and insert --a--;
   line 46, after "dowel", insert --.--; delete "as" and insert --As--.

Signed and Sealed this

Twenty-seventh Day of July, 1999

Attest:

Q. TODD DICKINSON

*Attesting Officer*   *Acting Commissioner of Patents and Trademarks*